March 4, 1958 G. W. CLEVERSEY 2,825,076
ROUGH ROUNDING MACHINES
Filed Sept. 26, 1955 11 Sheets-Sheet 1

Inventor
Gerald W. Cleversey
By his Attorney
Thomas J. Ryan

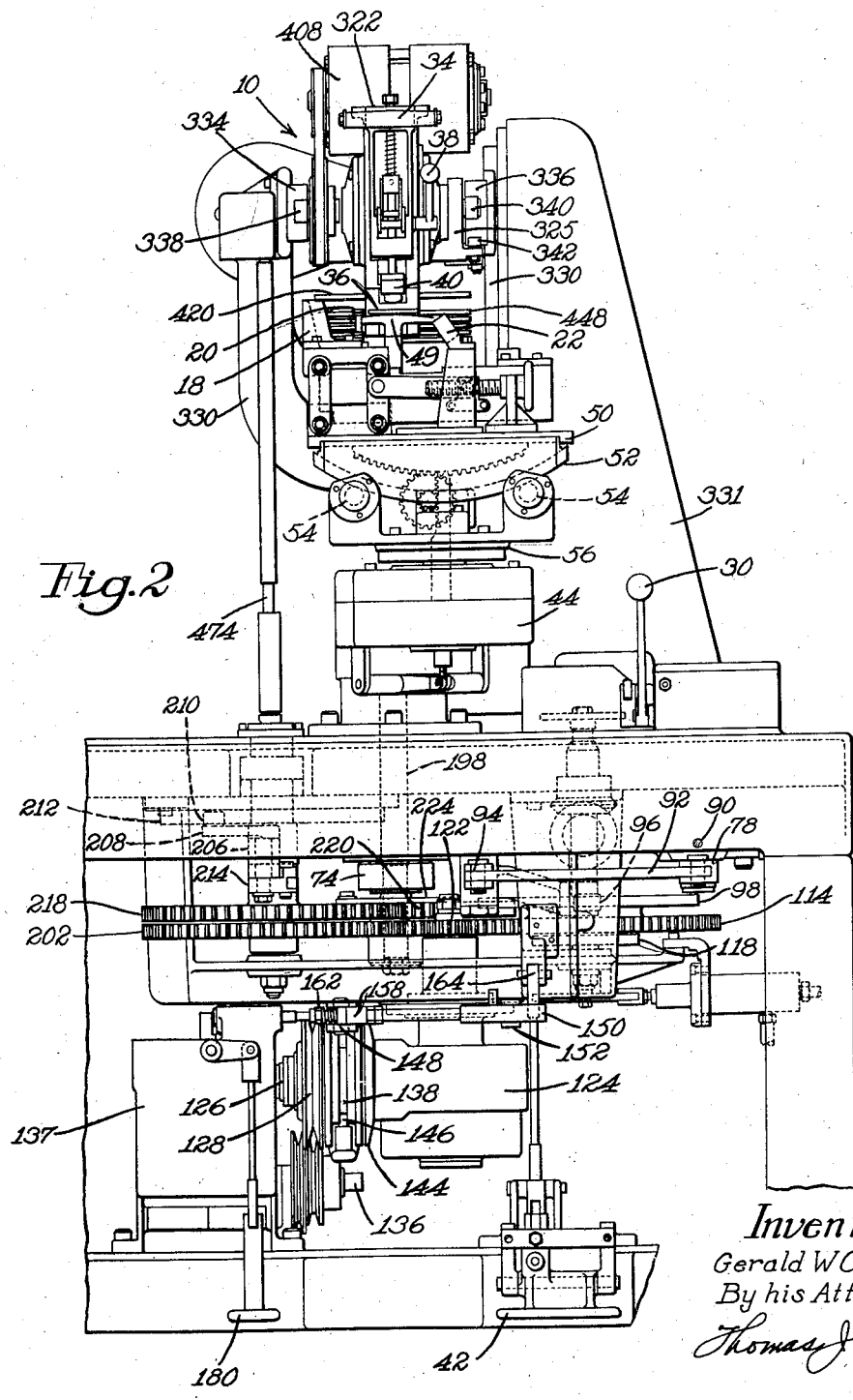

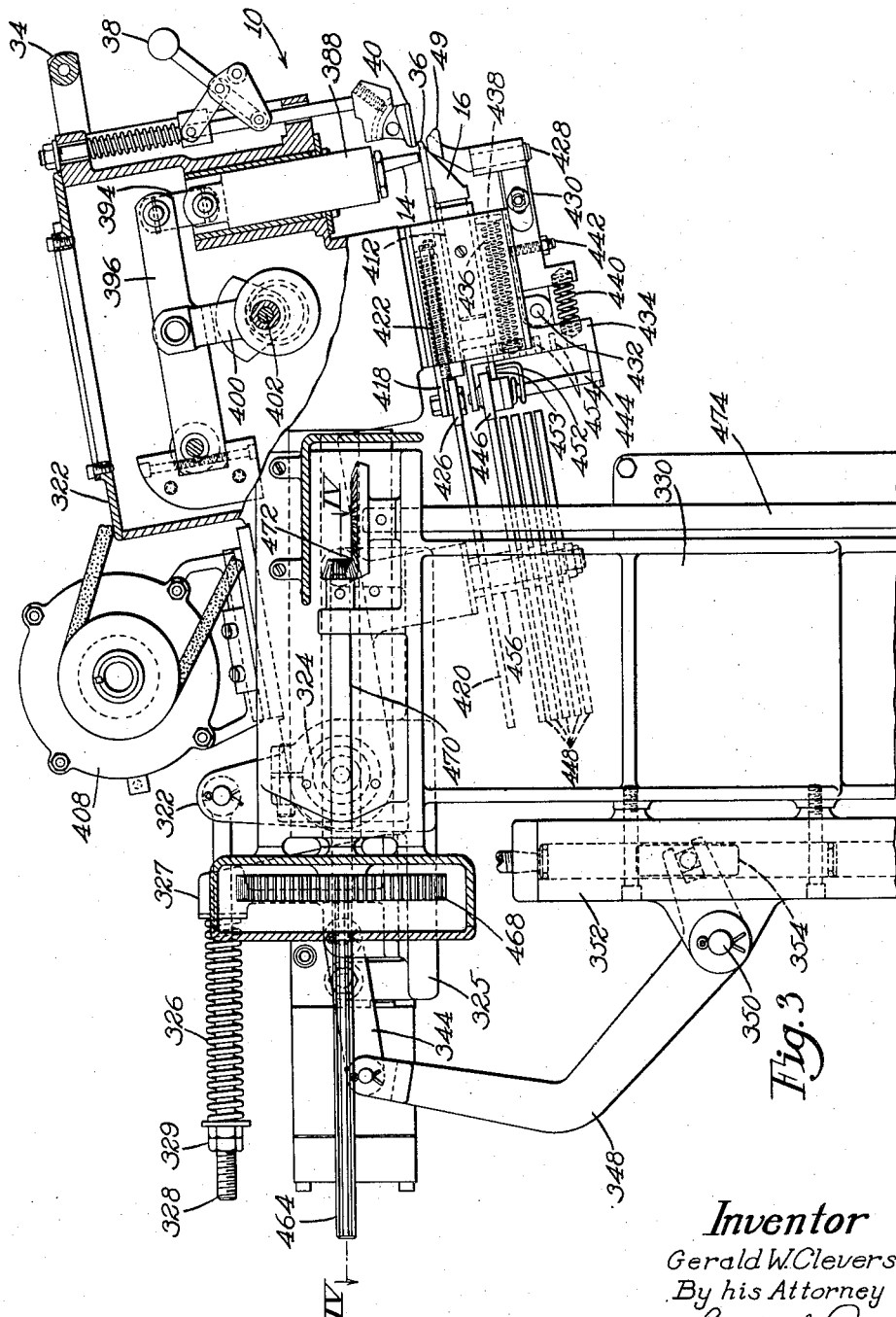

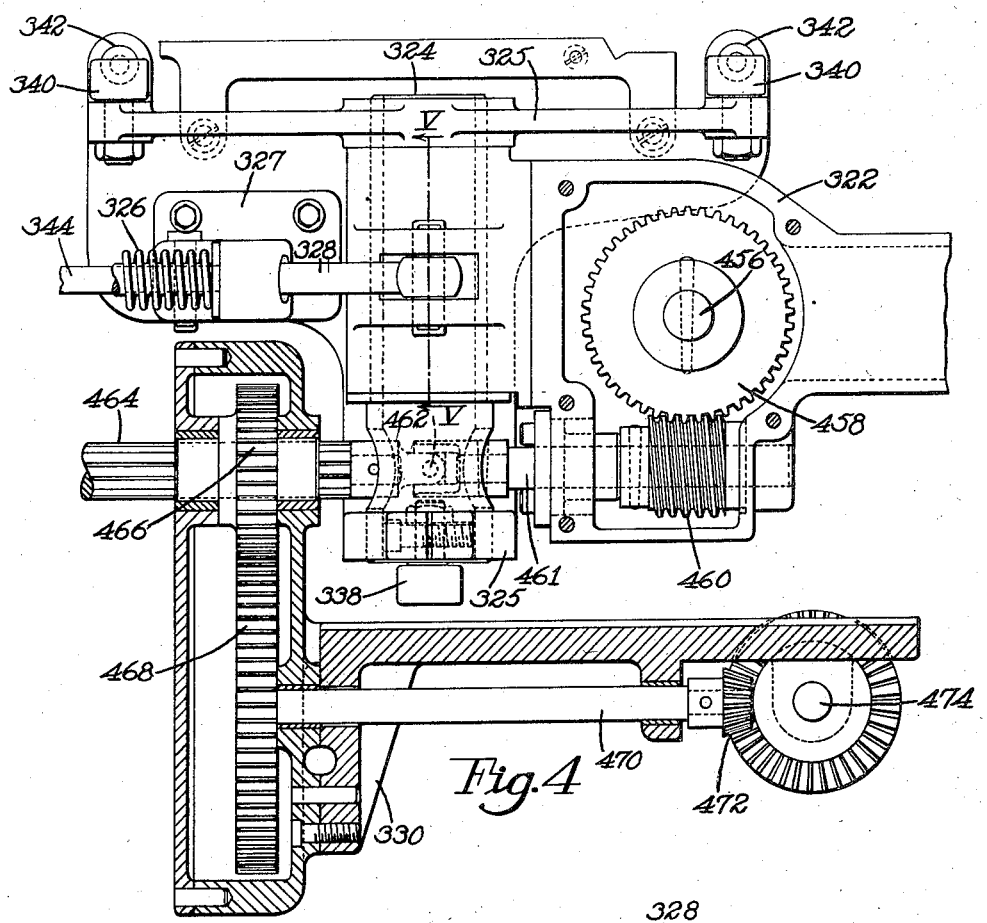
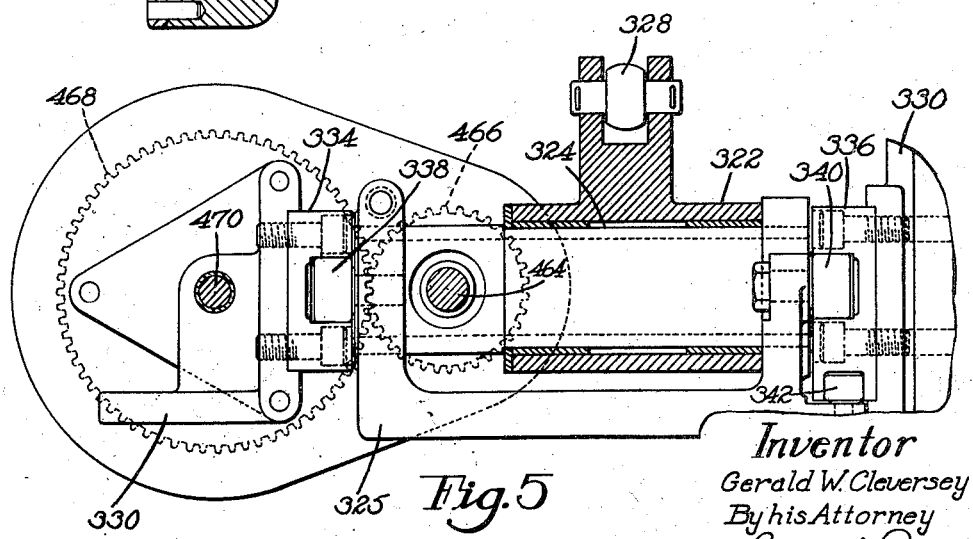

March 4, 1958  G. W. CLEVERSEY  2,825,076
ROUGH ROUNDING MACHINES
Filed Sept. 26, 1955  11 Sheets-Sheet 5

Inventor
Gerald W. Cleversey
By his Attorney
Thomas J. Ryan

March 4, 1958  G. W. CLEVERSEY  2,825,076
ROUGH ROUNDING MACHINES

Filed Sept. 26, 1955  11 Sheets-Sheet 11

Inventor
Gerald W. Cleversey
By his Attorney
Thomas J. Ryan

# United States Patent Office 2,825,076
Patented Mar. 4, 1958

2,825,076

ROUGH ROUNDING MACHINES

Gerald W. Cleversey, Topsfield, Mass., assignor to United Shoe Machinery Corporation, Flemington, N. J., a corporation of New Jersey Application September 26, 1955, Serial No. 536,447

33 Claims. (Cl. 12—85)

This invention relates to rough rounding machines, and is illustrated herein as embodied in an automatic rounding machine of the type disclosed in an application of E. W. Stacey for United States Letters Patent, Serial No. 559,654, filed on January 17, 1956. More particularly, the present invention is concerned principally with jack operating mechanism, that disclosed herein being an improvement upon the corresponding mechanism in a similar machine disclosed in United States Letters Patent No. 2,682,674, granted on July 6, 1954 upon an application of E. W. Stacey.

A sole is presented to the cutter head of the last-mentioned machine progressively to transfer the point of operation of the cutter about the periphery of the sole, under the guidance of a pattern upon which the sole is clamped, by a support which has combined movements of rotation and oscillation, the support being continuously rotated in the same direction upon a carrier which receives oscillations during each cycle of operation of the machine. The oscillating movement of the support in this machine is simple harmonic, and invariable except for its amplitude, being derived from a steadily rotating crank of adjustable throw. The support is rotated at a variable rate, but always in the same direction, by gearing which is driven by a steadily rotating driving gear, this gearing being so arranged that the first and third oscillations of the carrier, during which the sides of the sole are being operated upon, cause a diminished rotation of the support on the carrier because of an epicyclic relation in the gearing. Similarly, during the second and fourth oscillations of the carrier, when the end portions of the sole are presented to the cutter, the rotation of the support upon the carrier is materially increased, because of the above-mentioned epicyclic gearing.

An object of combining these rotative and oscillatory movements of the support is to cause the sole to be oriented with respect to the cutter head so that the feeding movement of the work at the operating point of the cutter thereupon is, as nearly as possible, in the direction of the edge of the rounded sole at the operating point. Moreover, during the rounding operation the support and cutter head have such relative movements of approach and separation, under the control and guidance of the pattern, as are necessary to maintain the engagement of the cutter head and the pattern notwithstanding the eccentric shape of the latter. Accordingly, it is also desirable that the sole and pattern be oriented in the manner described above in order that their peripheries, at the point of operation of the cutter head, will be maintained as nearly normal as possible at all times to the direction of the relative movements of approach and separation of the support and cutter head, so as to minimize any jamming tendency between the pattern and cutter head during their relative movement of separation.

With a view to improving the orientation of the work with respect to the cutter head of the illustrated machine, the present invention provides driving mechanism for the work support, disclosed herein as a jack for a lasted shoe, which, in accordance with one feature of the invention, is constructed and arranged not only to oscillate the jack and simultaneously rotate it in one direction throughout most of the operating cycle, but also to impart an opposite or reverse rotation to the jack during a short interval in the cycle when the operating point of the cutter head upon the shoe passes the vicinity of the inner ball line. Here, the changes in direction of the sole edge are so pronounced that reversal, rather than mere deceleration, of the normal rotative movement of the jack on the carrier is necessary to obtain, fully, the desired relations between the work, its feeding movement, and the relative movements of approach and separation of the work and cutter head.

The rotative movement of the jack on the carrier, in the illustrative machine as well as in the prior machines, is subject to changes in speed in the same direction because of the effect of the oscillation of the jack carrier upon the epicyclic gearing in the driving mechanism for the jack. However, the above-mentioned reverse rotation of the jack is effected in the present machine owing to the inclusion in the jack driving mechanism of additional control means which is arranged to drive the said gearing at a variable rate and in opposite directions.

This control means, in accordance with a further feature of the invention, includes, with a driving member having a constant velocity and a driven member, mechanism interposed between these members for reversing the normal direction of movement of the driven member, during a portion of each cycle of operation of the driving member, relatively to both the driving member and the frame of the machine. Accordingly, through the said epicyclic gearing, between the above-mentioned driven member and the jack, the latter receives a reverse rotation at the time referred to above, not only with respect to the jack carrier but also with respect to the frame of the machine, sufficient to effect the desired truly normal relation between the work and the cutter head. In the illustrated embodiment of the above-mentioned control mechanism, the driving and driven members are gears, the driven gear being rotated at a variable velocity and having imparted thereto the reverse rotation referred to above by cam operated connections between the gears.

Because of the varying inclinations with respect to the shoe bottom of the portions of the shoe upper which are engaged by the cutter head, for purposes of guiding it so as to produce the desired sole edge extension, the present machine has, in accordance with common practice, a crease guide for guiding the cutter head when the shank portion of the shoe is operated upon, as well as a gage for guiding the cutter head during the remainder of the rounding cut. As is well understood in this art, an interchange of the gage and guide is made when the rounding cut passes the vicinity of the ball line at each side of the shoe, and if the heel part of the sole is to be rounded, similar interchanges of the gage and guide will be made in the vicinity of the heel breast line at each side of the sole.

When the sides of the sole are presented to the cutter head in the earlier Stacey machine mentioned above, the support has a minimum of rotative movement upon the carrier and the feeding movement of the work is derived, for the most part, from the oscillating movement of the jack carrier. Since the carrier oscillating mechanism is driven by a crank, the oscillating movement of the work is simple harmonic and its maximum velocity (feeding movement) is attained while the mid portions of the sole at each side are presented to the cutter head.

Were such structure to be used in the illustrative machine the interchanges of the gage and guide, made when the mid portions of the sole in the vicinity of the ball line are being operated upon, would take place during the maximum feeding movement, and it is evident that the faster the feeding movement of the work is at such times the greater will be the tendency for irregularities to occur in the sole edge where the interchanges occur.

In view of the foregoing, another object of the invention is to insure smoothness of the rounding cut and in the interchanges of the gage and guide, particularly when the rounding cut is passing the vicinity of the ball line at each side of the shoe, and at the same time to minimize the length of the rounding cycle.

With this end in view, the invention also provides, in accordance with another feature thereof, improved mechanism for oscillating the jack carrier at a variable rate such that the feeding movement of the work has a period of appreciable deceleration when the rounding cut passes the vicinity of the ball line at each side of the sole, the rounding cut being made so fast before and after the periods of deceleration as to compensate for the latter so far as the length of the rounding cycle is concerned. By such deceleration of the feeding movement the spacing of the cuts made by the rounding knife is shortened with an accompanying increase in the smoothness of the sole edge, and the periods available for the interchanges of the gage and guide during the reduced feeding movement are elongated. The interchanges of the gage and guide may, therefore, be carried out more gradually than would be possible without these periods of deceleration in the feeding movement of the work, and the smoothness of the rounding cut is enhanced for this reason as well as on account of the close spacing of the cuts.

The jack driving mechanism is also designed, in accordance with another feature of the invention, to provide other periods of deceleration in the feeding movement of the work, with the same beneficial effect upon the smoothness of the rounding cut, when both ends of the sole are presented to the cutter, the deceleration at the toe end being the more extreme, in order to obtain the closer spacing of rounding cuts where the sole edge has the shorter radius of curvature.

These and other features of the invention, including various details of construction and combinations of parts, will now be described in detail and pointed out in the appended claims.

In the drawings,

Fig. 2 is a front elevation of the right-hand unit of the machine;

Fig. 3 is a side elevation of the cutter head as viewed from the left;

Fig. 4 is a sectional plan view of a part of the mounting and driving mechanism for the cutter head, the section being taken along the line IV—IV in Fig. 3;

Fig. 5 is a front elevation, partly in section, of structure shown in Fig. 4, the section being taken along the line V—V;

Figure 1:
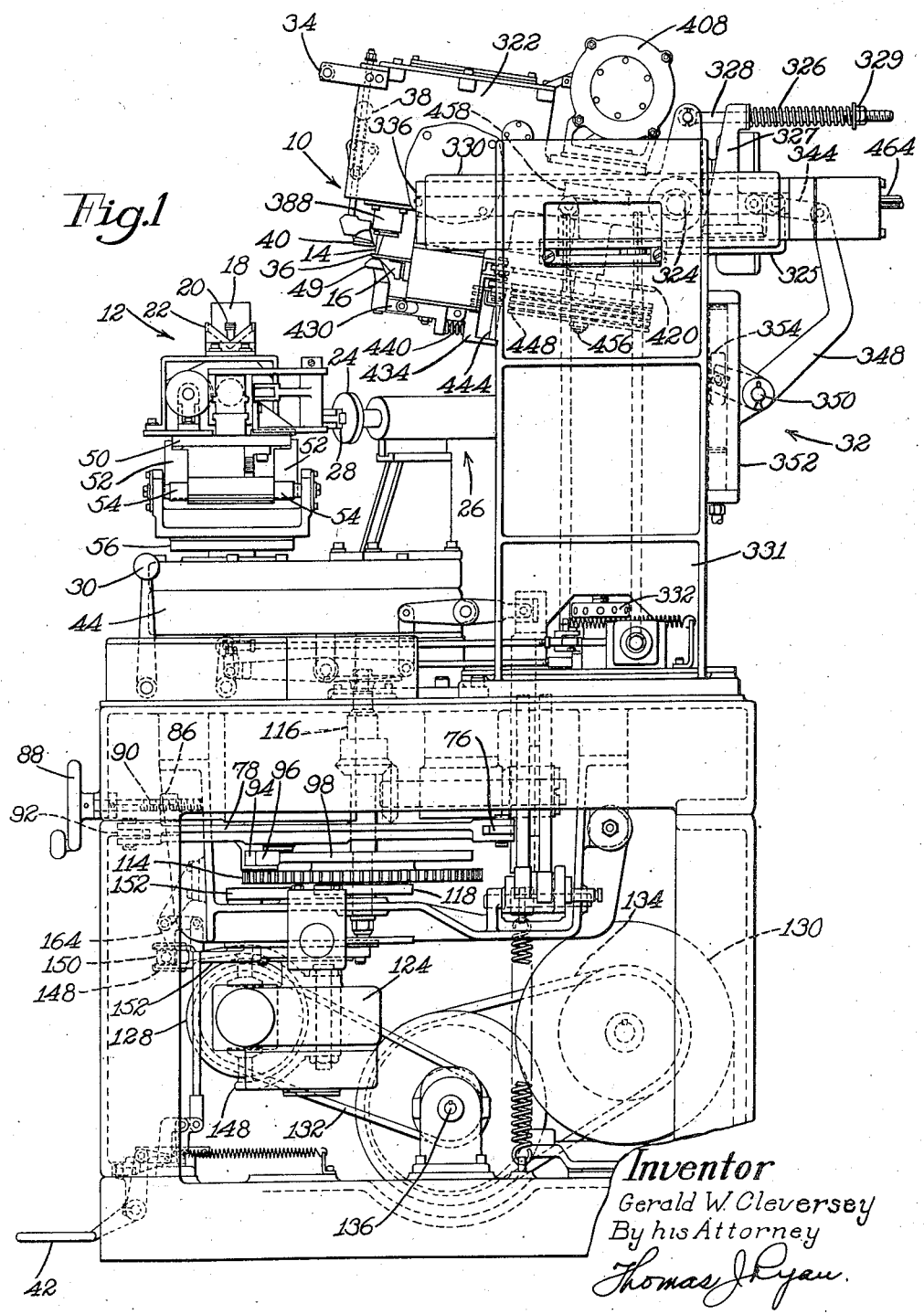
Fig. 1 is a side elevation of an illustrative machine embodying the invention, the machine being viewed from the right.

The illustrative machine comprises a cutter head 10, which normally is in an inoperative position as illustrated in Fig. 1, retracted from a jack 12 for holding a lasted shoe upon which a rough rounding operation is to be performed. The rounding cut is effected by a succession of chopping cuts made by a reciprocatory chopping knife 14 which cooperates, in shearing relation, with an anvil 16 fixedly mounted in the cutter head. A lasted shoe to be operated upon is placed in the jack which has a heel abutment 18 for positioning the shoe lengthwise of the jack, a jack pin 20 adapted to be received in the thimble in the heel part of the last, and a rest 22 for supporting the forepart of the last. The jack includes means normally acting upon the jack pin 20 to cause the last to be firmly clamped by the heel abutment, jack pin and forepart rest; but between successive cycles of operation of the machine, and while the cutter head is in its inoperative position, a plunger 24 of a jack operating means 26 is advanced into engagement with a driving member 28, associated with the jack, to remove the clamping pressure from the jack pin 20 thereby permitting the removal of the lasted shoe from the jack at the completion of a rounding operation and the mounting upon the jack of the lasted shoe next to be operated upon.

After having placed a lasted shoe upon the jack, the operator pulls forwardly a control lever 30 which causes the release of the cutter head 10 for advancing movement into engagement with the shoe under the impulse of a fluid operated mechannism 32. This mechanism holds the cutter head against the shoe during the rounding operation and is actuated at the end of the rounding operation automatically to return the cutter head to its inoperative position. During the advancing movement of the cutter head into engagement with the shoe, the operator grasps a handle 34 on the cutter head and swings the latter heightwise to bring a crease guide 36 into the welt crease of the shoe, the upper surfaces of the guide and the above-mentioned anvil 16 being flush and adapted to bear against the welt of a welt shoe, or the corresponding part of a shoe of any different construction. Now, the operator swings forwardly a lever 38 which causes a bottom rest 40 to be lowered into engagement with the shoe bottom and to apply a yielding pressure thereto. Thus, the shoe is yieldingly gripped between the bottom rest and the crease guide 36 throughout the rounding operation, and the cutter head is swung vertically under the control of the bottom rest and crease guide in accordance with changes in the level of the sole at the point of operation of the cutter head upon it.

The illustrated structure constitutes the right-hand unit of the machine which also includes a similar left-hand unit, these units having been designed to operate upon right and left shoes, respectively. The left-hand unit has been omitted from the drawings, but it is to be understood that this unit is the same as that illustrated, except for the symmetrical arrangement of some of its parts necessitated by the fact that all movements of the jack of the left-hand unit are opposite to the corresponding movements of the right-hand jack, in order that the rounding operation will be carried out in the same manner upon both shoes of a pair.

The rounding cut upon both right and left shoes is begun at the outside heel breast line, is advanced forwardly along the outer side of the shoe, then around the toe, then along the inner side of the shoe and finally around the heel, terminating at the starting point. This transfer of the point of operation of the cutter around the shoe is effected by combined oscillatory and rotary movements of the jack. The jack of the earlier Stacey machine referred to above also has simultaneous swinging and rotary movements. However, as will more fully appear later, these movements of the jack disclosed herein are materially different, individually, from those of the Stacey machine just referred to, and also have been combined in a different manner to improve the shoe following action of the cutter head, as well as the smoothness of the rounding cut, particularly in those zones where the control of the cutter head is shifted between the crease guide and forepart gage.

Figure 8:
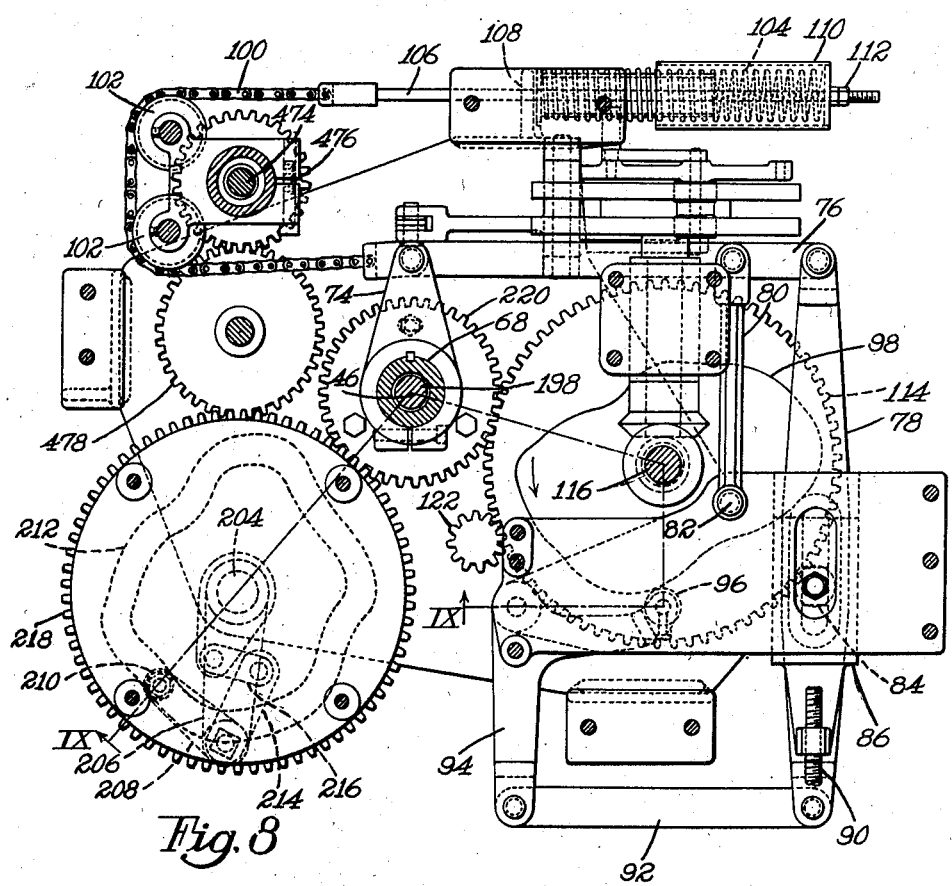
Fig. 8 is a sectional plan view of the jack driving mechanism.
Figure 9:
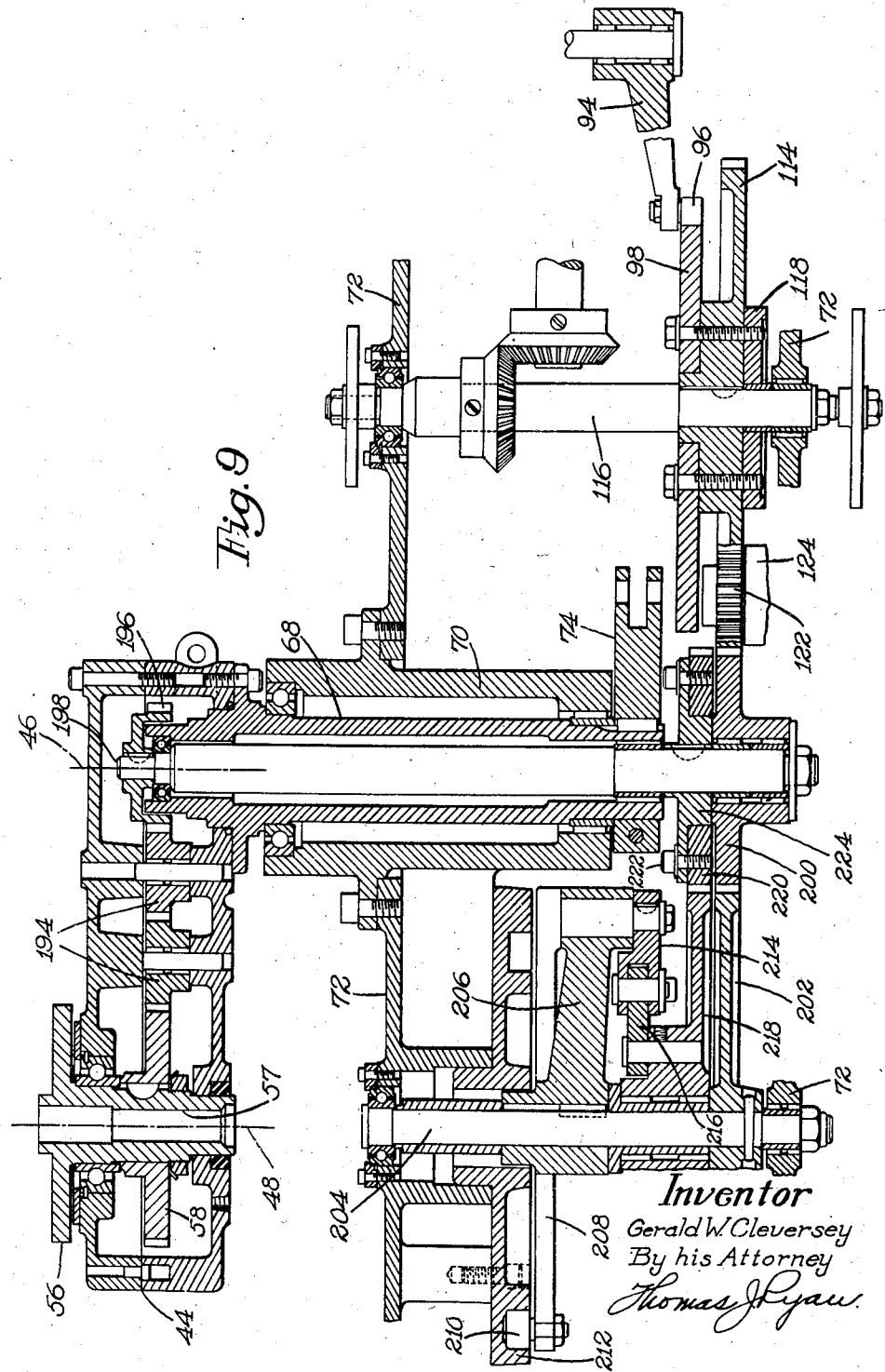
Fig. 9 is a sectional elevation of structure shown in Fig. 8, the section being taken along the broken line IX—IX of Fig. 8.

Referring now to the right-hand unit of the machine illustrated herein, after the cutter head 10 has been brought into operative relation to the shoe, the operator depresses a treadle 42 to initiate a cycle of operation of mechanism for driving the jack. This driving mechanism imparts oscillations to a jack carrier 44 about a fixed vertical axis at 46 (Figs. 8 and 9), and simultaneously rotates the jack 12 upon the carrier about a vertical axis 48 (Fig. 9). During the first oscillation of the carrier, to the left from its position illustrated in Fig. 2, the rounding cut is transferred from the outside heel breast line of the sole to a point near the toe thereof. During the second oscillation of the carrier (to the right), the cut is transferred around the substantially circular toe portion of the sole. During the third oscillation of the carrier (again to the left), the rounding cut is transferred along the inside of the sole to the inner heel breast line and finally, during the fourth oscillation of the carrier (again to the right), the rounding cut is transferred around the substantially circular portion of its heel end of the sole to the starting point of the cut. Throughout these four oscillations of the jack, it is rotated upon the carrier 44 at a variable velocity counterclockwise, except when the rounding cut passes the inner shank where, for a short period, the rotation of the jack upon the carrier is reversed, as will be more fully described later.

While the rounding cut is carried along the outer shank of the shoe the sole edge extension is under the control of the crease guide 36, which is movable relatively to the knife in order to produce a varying extension, if desired. At the outer junction of the shank and forepart, the crease guide is ordinarily retracted from the side of the shoe, without being moved away from the welt, and a forepart gage 49 is advanced into engagement with the side of the shoe, these movements of the gage and guide taking place simultaneously without permitting any lapse in the control of the shoe. As the rounding cut passes the inner junction of the shank and forepart, the forepart gage is retracted from the shoe and the crease guide is advanced toward the shoe to take over the control thereof which is continued until the rounding cut reaches the heel breast line. At this point, control of the shoe is returned to the forepart gage which is advanced into engagement with the shoe as the crease guide is backed slightly away from the shoe. When the cycle of operation of the jack is about to be terminated and the rounding cut approaches the outer heel breast line, the crease guide and forepart gage are again interchanged to restore the control of the shoe to the crease guide, in preparation for the next rounding cut which will be made along the outer shank of the shoe next to be operated upon.

As soon as the rounding cut has been completed, the jack driving mechanism is automatically disconnected from the source of power so that the jack is stopped in its original position and the fluid operated means 32 is automatically actuated to retract the cutter head into its inoperative position. Furthermore, in response to the return of the cutter head into its inoperative position the jack operating means 26 is actuated to advance the plunger 24 into engagement with the driving member 28 and to unclamp the lasted shoe on the jack. The mechanism for thus controlling the operation of the jack driving mechanism, the fluid operated means 32 and the jack operating mechanism 26 will not be described in detail herein as it forms a part of the subject matter fully disclosed and claimed in the above-mentioned Stacey application.

Having broadly outlined the use end operation of the machine, its structure, which is related to the present invention, will next be described in detail. The jack 12 has a base 50 (Figs. 1 and 2) upon which are mounted a pair of arcuate runners 52, 52 which are supported by a pair of rolls 54, 54 so as to permit such pitching movement to be imparted to the jack as is necessary to maintain the sole bottom level, notwithstanding its longitudinal curvature, at the point of operation of the cutter. The rolls are mounted upon a yoke 56 having a hollow shank 57 (Fig. 9) which is rotatably mounted upon the forward end of the carrier 44 and has keyed thereto a gear 58. Pitching movement is imparted to the jack, in order to maintain the sole bottom level at the operating point of the cutter head, by rack and pinion connections, associated with the base 50 and yoke 56, which form no part of the present invention and are not described in detail herein, but are fully disclosed in the above-mentioned Stacey application.

Figure 11:
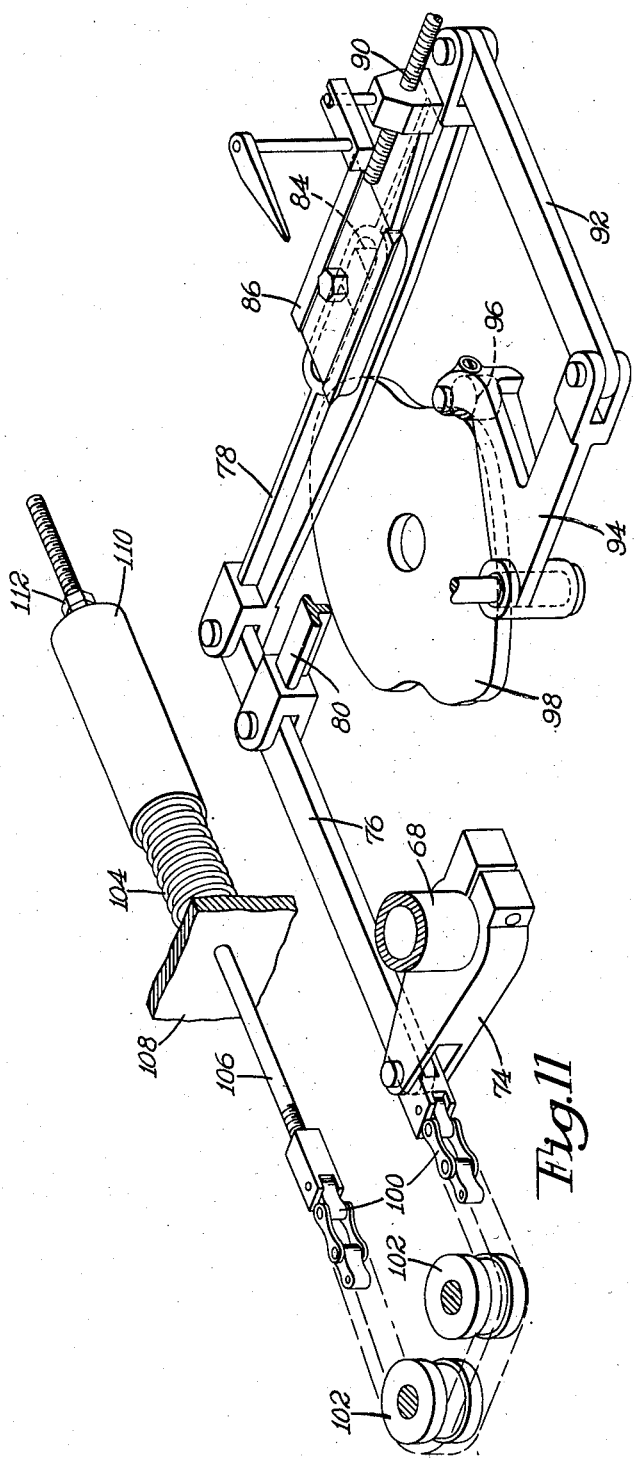
Fig. 11 is a perspective view of mechanism illustrated in Fig. 8 for imparting a variable swinging movement to the jack.

The jack carrier 44 is fixed upon the upper end of a sleeve 68 which is mounted upon antifriction bearings in another sleeve 70, the latter being fixed to the frame 72 of the machine. Upon the lower end of the sleeve 68 is fixed an arm 74 (Figs. 9 and 11) which is operated through cam driven connections, next to be described, for imparting the above-mentioned oscillations to the jack. A link 76 (Figs. 8 and 11) pivoted at one end to the arm 74 and at its other end to a lever 78, is fulcrumed upon another link 80 which is pivoted upon the frame at 82. The lever 78 has an elongated slot arranged to receive a block 84 which is pivotally mounted upon a slide 86, the latter being dovetailed upon the frame 72 for adjustment so as to vary the ratio of the arms of the lever 78. This adjustment is made, to vary the amplitude of oscillation of the jack according to the length of the shoe to be operated upon, by turning a hand wheel 88 (Fig. 1) which is fixed upon a screw 90 (Figs. 8 and 11) rotatably mounted upon the frame at the front of the machine and threaded into the slide 86. To the forward end of the lever 78 there is pivoted one end of a link 92, the other end of which is pivoted upon a bell crank 94 which is rotatably mounted upon the frame and carries a cam follower 96 arranged to roll upon a cam 98. When a rising slope on the cam 98 moves past the follower 96 the bell crank 94 is rotated clockwise and an oscillation in the same direction is imparted to the jack carrier 44. The carrier is moved in the opposite direction, under the control of the cam 98, when a falling slope on it is presented to the follower 96, by connections comprising a chain 100 which is connected at one end to the link 76, runs over idler rolls 102 rotatably mounted on the frame, and is energized by a spring 104 which surrounds a rod 106 to which the chain 100 is connected. The spring 104 is compressed between a lug 108 formed integral with the frame and a tubular cap 110 the position of which may be varied lengthwise of the rod 106, to vary the compression of the spring, by adjusting check nuts 112 along the rod 106. It will now be evident from the shape of the cam 98 that during each revolution of the cam the carrier 44 will have four oscillations the amplitude of which can be varied, to suit different sizes of shoes, by turning the hand wheel 88.

The above-mentioned cam 98 is fixed upon the hub of a gear 114 (Figs. 8 and 9) which is keyed to a shaft 116, the latter being rotatably mounted in the frame 72. Fixed upon the lower side of the gear 114 is a cycle control cam 118, the purpose of which will be described later. A pinion 122, fixed upon the output shaft of a reduction gear unit 124 (Figs. 1 and 2), drives the gear 114, this unit having an input shaft 126 upon which is mounted for free rotation a driving pulley 128, the latter being driven by a motor 130 through connections comprising belts 132, 134 and a countershaft 136 having pulleys for the belts. A pump (not shown) housed in a reservoir 137 for the fluid pressure system is directly connected to the countershaft. A frictional drive is provided between the pulley 128 and input shaft 126 by a clutch collar 138 which is splined to the shaft and is movable axially thereof into engagement with the pulley under the influence of a series of springs (not shown) which are housed within the collar and bear against a flange on the shaft 126. By moving the clutch collar 138 away from the pulley 128 and into engagement with a braking flange 144, fixed to the frame of the unit 124, the drive is interrupted and the shaft 126 is stopped, as will presently be described.

Figure 12:
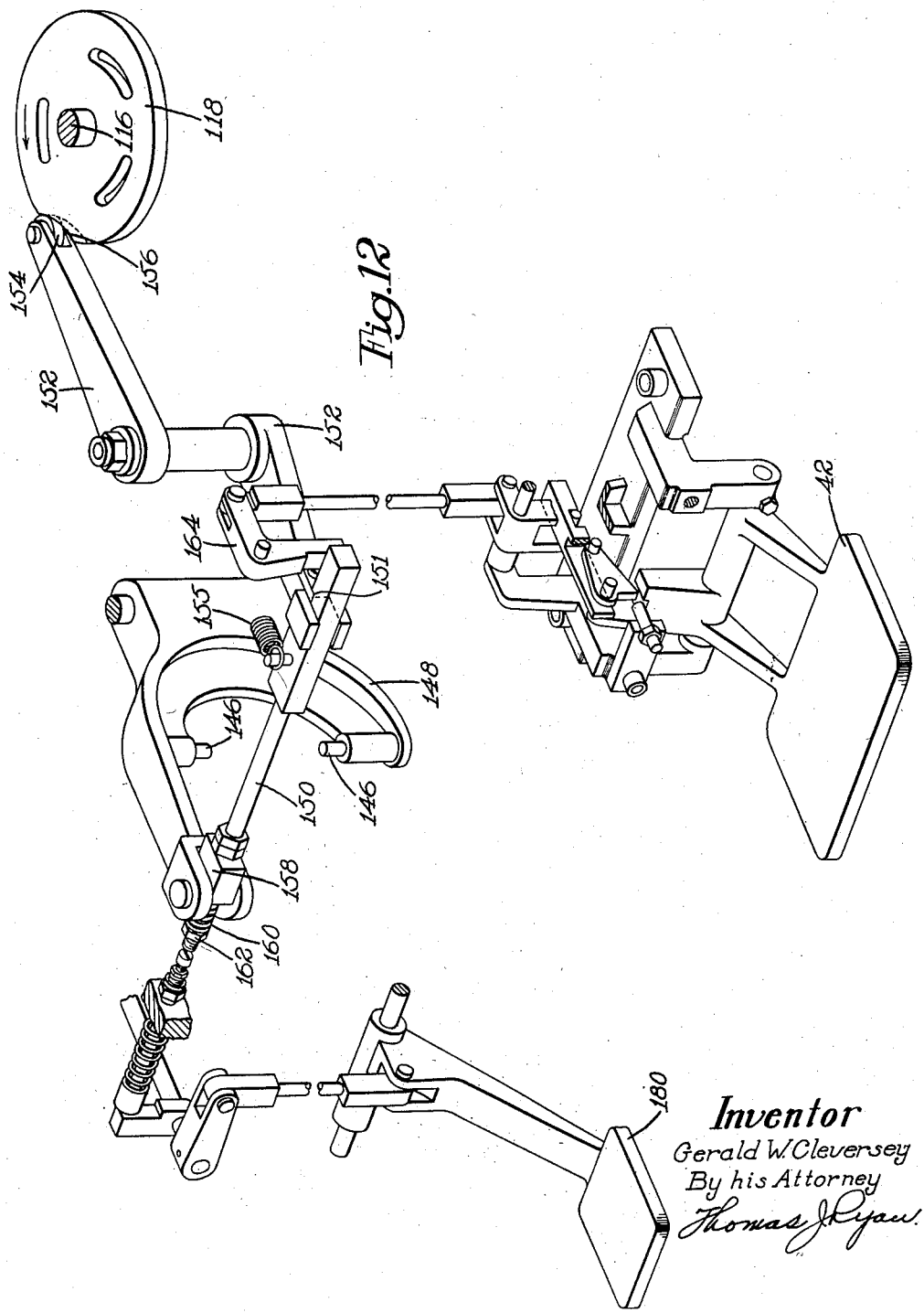
Fig. 12 is a perspective view of operator controlled mechanism for controlling the operation of the jack driving mechanism.

Until a cycle of operation of the jack is started the clutch collar 138 is held against the braking flange 144 by the following connections. A peripheral recess in the collar receives pins 146 (Fig. 12) carried by a yoke 148 which is pivotally mounted upon the frame for swinging movement so as to move the collar into engagement with either the pulley 128 or the braking flange 144. Connected to the forward end of the yoke is a latch bar 150 having a notch 151 for receiving the forward end of one arm of a bell crank 152, the other arm of which carries a roll follower 154 which runs upon the above-mentioned cycle control cam 118. A spring 155 stretched between the frame and the latch bar urges the bar against the bell crank 152.

Before a cycle of operation of the jack driving means is started the roll 154 bears against a shoulder at the trailing end of a notch 156 in the cam 118 and the bell crank 152, acting through the latch bar 150, holds the yoke 148 to the right so as to produce a braking effect between the collar 138 and the flange 144. The latch bar 150 passes freely through a block 158 which is pivoted to the yoke 148 and a spring 160 is interposed between the block and a nut 162 threaded on the latch bar so as to cause the collar 138 to be held against the braking flange 144.

Through connections, which are fully disclosed in the above-mentioned Stacey application, depression of the treadle 42 causes a bell crank 164, rotatably mounted upon the frame 72, to disengage the latch bar 150 from the bell crank 152 whereby the clutch collar 138 is permitted to be moved into driving engagement with the pulley 128 by the springs housed in the collar. Thus, a cycle of operation of the jack driving means is started, whereupon the cycle control cam 118 swings the crank 152 to the right of the notch 151 so that it normally will not be reengaged with the crank until the end of the cycle is reached.

The operator can stop the jack driving mechanism at any time during an operating cycle by depressing another treadle 180. Depression of this treadle causes the latch bar 150 to be pushed to the right and to be reengaged with the bell crank 152 which is now so positioned by the cam 118 as to cause the clutch collar 138 to be held firmly against the braking flange 144. Operation of the machine may be resumed by again depressing the treadle 42.

Toward the end of each cycle, the roll 154 on the lever bell crank 152 drops into the notch 156 of the cam 118 allowing the bell crank 152 to become seated again in the notch 151 in the latch bar 150 and, as the trailing rising slope of the notch 156 is presented to the roll 154, the latch bar 150 is pulled to the right, thereby causing the clutch collar 138 to be disengaged from the pulley 128 and to engage the braking flange 144. Thus, the jack driving mechanism is stopped just before the roll 154 reaches the trailing end of the notch 156.

During each cycle of operation of the machine, in which the cam 98 makes one revolution, the jack is given four oscillations, one to the left, the next to the right, another to the left and the last one to the right. Also during each cycle, the jack is rotated counterclockwise, except for a short period when reversed clockwise rotation takes place, with respect to the carrier through one revolution, at a variable velocity, by the connections next to be described.

Figure 10:
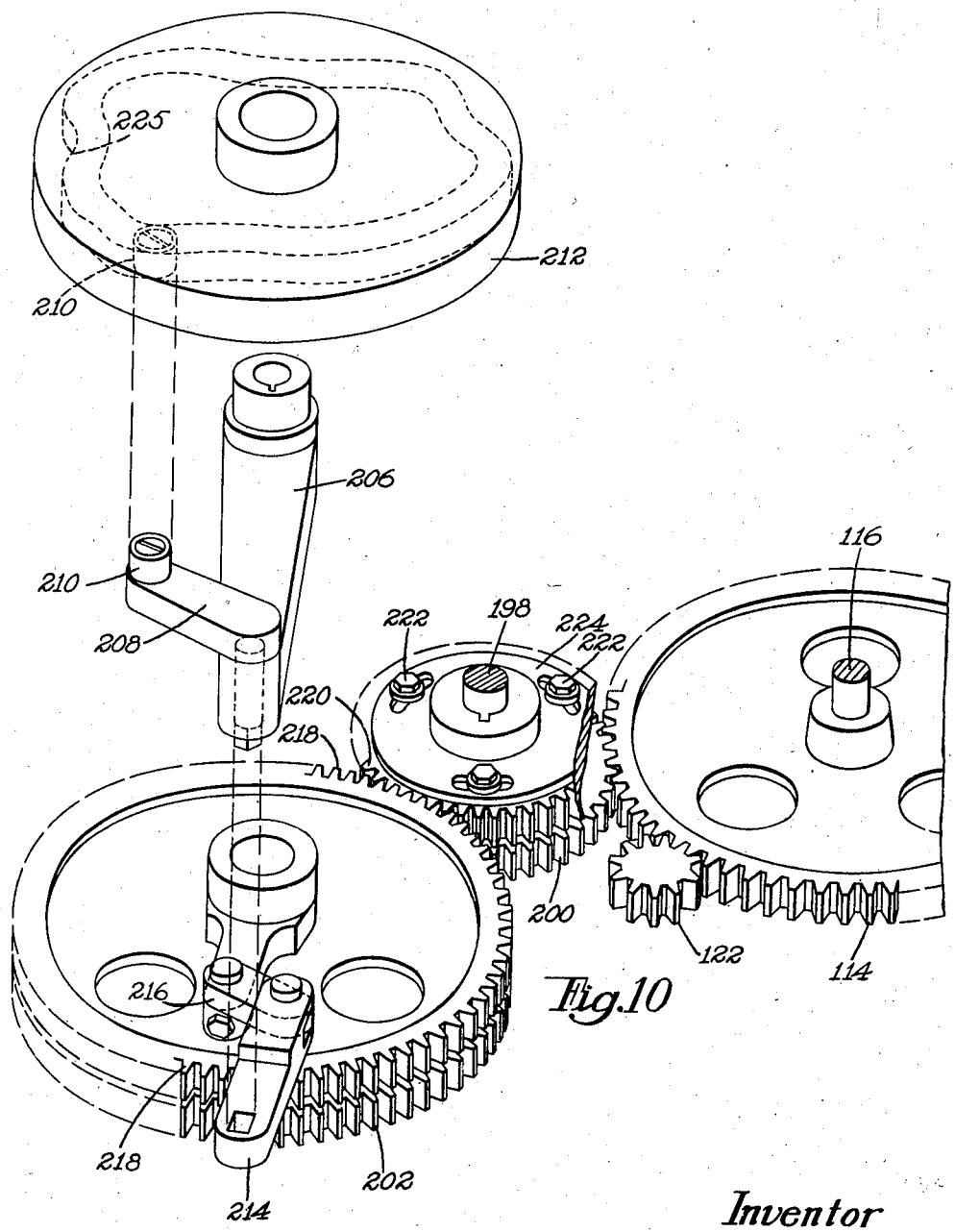
Fig. 10 is a perspective view of control mechanism shown in Figs. 8 and 9.

The above-mentioned gear 58 (Fig. 9) is connected by idler gears 194, 194, rotatably mounted upon the jack carrier 44, with a pinion 196 which is keyed to the upper end of a shaft 198, the latter being mounted to rotate freely within the sleeve 68. A gear 200, mounted to rotate freely upon the lower end of the shaft 198, meshes with both the above-mentioned gear 114 (Figs. 9 and 10) and another gear 202 which is pinned to a shaft 204, the latter being mounted upon antifriction bearings carried by the frame. Upon an arm 206, keyed to the shaft 204, is rotatably mounted another arm 208 carrying at its outer end a cam roll 210 which runs in a track in a cam 212, the latter being fixed to the frame. There is fixed to the arm 208 another arm 214 which is connected by a link 216 to a gear 218, the latter being mounted coaxially with the gear 202 to rotate freely upon the shaft 204. The gear 218 meshes with a ring gear 220 into which are threaded screws 222 which pass through elongated slots in a flange 224 keyed to the shaft 198, so that the ring gear and flange may be rigidly held together with provision for limited angular adjustment. It will now be evident that, because of the above-described control mechanism including the cam 212, the gear 218 will be accelerated or decelerated relatively to the gear 202 when the roll 210 traverses the portions of the cam track of diminishing or increasing radius, respectively, and that corresponding accelerations and decelerations in the rotation of the jack relatively to the carrier will occur.

As will be more fully pointed out below, the variations in the speed of rotation of the jack upon the carrier result from the combined effects of the above-described control mechanism and of the epicyclic action between the pinion 196 and the gear 194 meshing therewith. As stated above, the rotation of the jack upon the carrier, for the most part, is counterclockwise, decelerations occurring when the point of operation passes the toe and heel ends of the shoe and the vicinity of the outer ball line. Still another extreme deceleration in the rotation of the jack occurs when the point of operation passes beyond the inner ball line into the shank, this deceleration being derived from a slope 225 in the cam track in the cam 212 which is so extreme as to cause the jack to be rotated clockwise for a short period.

An analysis of the shape of the bottoms of many lasts of different sizes has shown that corresponding parts of their peripheral contours are subtended by the same angles taken about a vertical axis which passes through a point near the middle of the last bottom. Provision has been made in the jack 12, as disclosed in the above-mentioned Stacey application, for positioning the heel abutment 18 for any size of last so that the above-mentioned vertical axis of the last coincides with the axis of rotation of the jack. Also with the above consideration in view, the cam 98, for controlling the swinging of the jack carrier 44, and the cam 212, for controlling the variable rotation of the jack upon the carrier, have been designed, each with relation to the other, so as to cause the shoe to be positioned with the sole edge at the operating point of the cutter head precisely normal to the direction of the shoe following movement of the cutter head toward and away from the jack. Moreover, these motions of the jack have also been so combined as to cause the feeding movement always to be normal to the shoe following movement of the cutter head, as well as in the direction of the tangent to the sole edge at the point of operation of the cutter upon the sole. Thus, the proper placement of each last upon the jack in relation to its axis of rotation permits one set of the cams 98, 212 to provide a combined swinging and rotative movement of the jack which will effect both the desired feeding movement and the normal relation between the shoe following movement of the cutter head at all points around the periphery of the sole edge, regardless of the size of the shoe being operated upon.

The cutter head 10 has a frame 322 (Figs. 3, 4 and 5) which, near its rear end, is mounted to swing about a horizontal axis upon a shaft 324 which is fast upon a carriage 325. The cutter head 10 is counterbalanced, so that it is normally held slightly above its operating level, as illustrated in Fig. 1, by a compression spring 326 which abuts an arm of a bracket 327 fixed to the carriage 325 and surrounds a rod 328 which is pivotally connected to the cutter head frame 322. Check nuts 329 threaded on the rod afford means for so adjusting the compression in the spring that the crease guide 36 and anvil 16 will be lightly biased upwardly against the shoe when the cutter head is in its operative relation with respect to the shoe. The carriage 325 is mounted to move freely horizontally toward and away from the jack upon a U-shaped slide 330 (Fig. 2) which is mounted for vertical adjustment upon a pedestal 331 fixed upon the frame. Vertical adjustment of the slide, for the purpose of bringing the cutter head to the desired level with respect to the work, is effected by turning a screw 332 (Fig. 1) which is threaded into the slide and bears at its lower end upon the base of the pedestal. The slide 330 (Fig. 5) comprises a pair of guideways 334, 336, the former of which has a groove for receiving a roll 338 rotatably mounted upon the left-hand side of the carriage 325. Similarly, a pair of rolls 340, 340, rotatably mounted upon the right-hand side of the carriage, are received in a groove in the guideway 336. This guideway has another groove in its bottom side which receives another pair of rolls 342, 342 for preventing the carriage 325 from swinging in a horizontal plane. The carriage 325 is moved to and fro along the guideways 334, 336 by the above-mentioned fluid-operated means 32 through connections comprising a link 344 (Figs. 4, 3 and 1) which is hinged to the bracket 327 and is pivoted upon the upper end of one arm of a bell crank 348. This crank is mounted to swing in a vertical plane upon a stud 350 which is carried by a cylinder 352 fixed upon the rear side of the slide 330. The other arm of the bell crank is connected to a piston 354, the operation of which under fluid pressure within the cylinder 352 effects the advancing and retractive movements of the cutter head toward and away from the shoe and holds the cutter head with a controlled variable pressure against the shoe, as described in the first-mentioned Stacey application.

The cutter 14 is mounted in a plunger 388 which is rapidly reciprocated in the cutter head frame by connections including a link 394, lever 396, connecting rod 400 and crankshaft 402, the latter being connected by a belt to a motor 408. The cutter cooperates with the anvil 16 which is recessed to receive the cutting edge of the cutter in shearing relation. The anvil 16 has a shank 412 which is received in a bore of the cutter head frame, permitting adjustment of the anvil into the above-described relation to the cutter 14.

In preparation for performing a rounding operation, the cutter head is advanced from its inoperative position, as illustrated in Fig. 1, toward the jack and is lowered by the operator so as to cause the crease guide 36 and anvil 16 to engage the upper surface of the welt, the crease guide being seated in the welt crease and bearing against the side of the shoe upper. The above-mentioned lever 38 is now swung forwardly from its vertical inoperative position to permit the bottom rest 40 to press against the shoe bottom. The margin of the sole is thus held between elements of the cutter head so that the latter, throughout the rounding operation, will swing heightwise upon the shaft 324 in conformity to variations in the height of the sole at the point of operation of the cutter thereupon.

At the beginning of a rounding operation, near the outer heel breast line of the shoe, the cutter head is under the guidance of the crease guide 36 which is seated in the welt crease with its upper surface engaging the welt and its forward end engaging the side of the upper close to the welt. As the rounding cut approaches the vicinity of the outer ball line the control of the cutter head is taken over by the forepart gage 49 which now is advanced from its inoperative position into its operative position, in engagement with the side of the shoe upper. Simultaneously with this movement of the forepart gage into its operative position, the crease guide is retracted away from the side of the shoe upper into its inoperative position so that the crease guide no longer has any guiding function so far as determining the sole edge extension is concerned. However, the crease guide still cooperates with the anvil to furnish a table of considerable area for supporting the upper surface of the welt of the shoe. Another interchange of the forepart gage and crease guide occurs later, in the vicinity of the inner ball line where the control of the cutter head is taken over by the crease guide; and similar interchanges, if the heel part of the sole is to be rounded, occur at the inner heel breast line where the control of the cutter head is shifted again to the forepart gage, and finally, at the outer heel breast line where the control of the cutter head is taken over by the crease guide again, in preparation for the rounding of the outside shank portion of the next shoe to be operated upon.

The crease guide 36 is formed upon the forward end of a slide 418 (Figs. 6 and 3) which is mounted in a recess in the cutter head frame freely to slide forwardly and rearwardly thereof under the control of a cam 420 which is rotated by connections, to be described later, through one revolution for each cycle of operation of the jack. A spring 422 compressed between a fixed lug 424 and the slide 418 urges the latter toward the cam 420 so as to hold a roll follower 426, mounted on the slide, always in engagement with the cam. Movement of the crease guide 36 between its operative and inoperative positions occurs without interference by the anvil 16 owing to the provision of an elongated recess 427 in the guide into which the anvil 16 projects with its upper surface flush with that of the guide.

The forepart gage 49 (Figs. 7 and 3) has a shank 428 which is freely rotatable in an arm 430 which is mounted to swing upon a stud 432 fixed upon a slide 434. This slide is mounted to move freely forwardly and rearwardly within the cutter head frame and is biased rearwardly thereof by a spring 436 which is compressed between the slide and a lug 438 integral with the cutter head frame. The arm 430 is yieldingly urged upwardly by a spring 440 compressed between the slide and the arm, the upper position of the latter being limited by a setscrew 442 which is threaded in the arm and adapted to engage the slide 434. Upon a shaft 444, mounted upon the rearward end of the slide 434, is rotatably mounted a roll follower 446 which is adjustable heightwise of the shaft 444 opposite to any one of a series of cams 448 which rotate with the above-mentioned cam 420. The roll follower 446 is supported opposite to the selected cam 448 by a clip 450 which is mounted to swing and slide axially on the shaft 444. The clip is biased by a spring 452 so as to hold a finger 453 on the clip within a recess 454 in the slide 434, there being a recess corresponding to each of the cams 448. The cams 448 have different shapes according to the different sole edge extensions required for shoes of different styles. Each cam has a "high" portion which, when presented to the roll 446, causes the forepart gage 49 to be held in its operative position; and these high portions of the cams may be of varying radius so as to cause variations in the sole edge extension while the cutter head is under the guidance of the forepart gage.

When a falling slope on the cam 448 passes the roll 446, this roll, the slide 434, and forepart gage 49 all move rearwardly, and with such rearward movement of the forepart gage, it swings with the arm 430 about the stud 432 and slides down the lower side of the anvil 16. The forepart gage is thus moved far enough backward and downward from the shoe to avoid interfering with the guidance of the cutter head by the crease guide. Later, as a rising slope on the cam 448 is presented to the roll 446, the slide 434 is moved forwardly to bring the forepart gage 49 into engagement with the shoe, as the crease guide 36 is retracted therefrom, the forepart gage now sliding obliquely upwardly in engagement with the lower side of the anvil until the setscrew 442 engages the bottom of the slide. Thereafter, with further forward movement of the slide, the forepart gage advances at the same level into its operative position. The forepart gage 49, as viewed in plan (Fig. 7), is slightly concave so that in passing the junction of the toe cap and vamp of a shoe the gage will bridge across the jog between these parts of the shoe and thereby avoid imparting a sudden movement to the cutter head at that point. This smoothing action of the forepart gage is furthered by the fact that it is pivotally mounted upon the arm 430, its pivotal action also serving to insure gradual movement of the cutter head because only a half of whatever displacement the leading end of the gage has is imparted to the arm 430.

Figure 7:
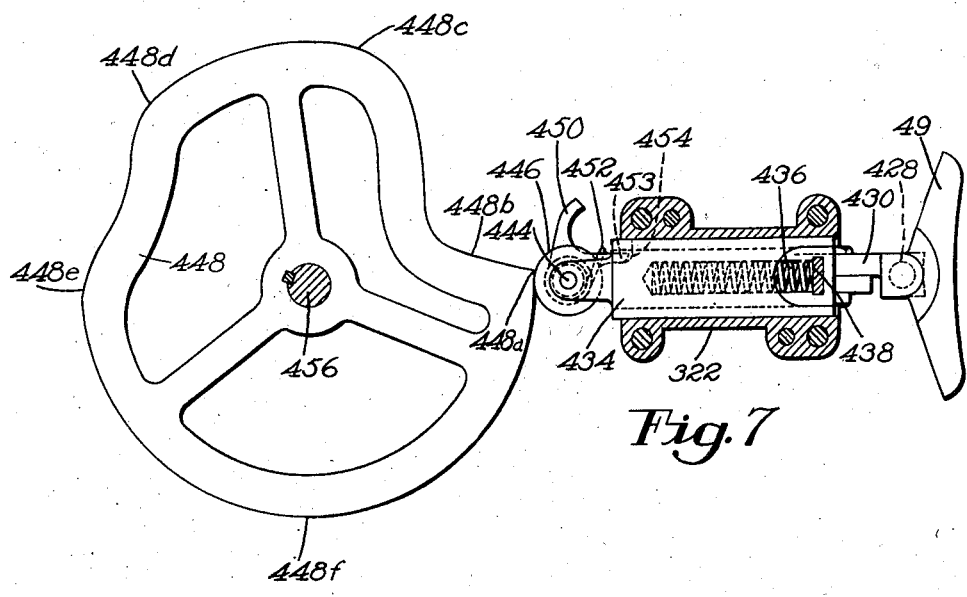
Fig. 7 is a view similar to Fig. 6 showing the forepart gage and its controlling mechanism.

In Fig. 7 there is illustrated the relation between the cam 448 and the follower 446 when the guidance of the shoe has just been taken over by the crease guide from the forepart gage at the inner ball line. At this time a slightly rising slope on the cam 448, terminating at 448a, will have been presented to the roll 446 to impart a gradually increasing extension to the sole edge as the rounding cut approaches the inner ball line. Similarly, a more pronounced rising slope on the cam 420 will also have been presented to the roll 426 associated with the crease guide so as to advance the crease guide into engagement with the shoe. The control of the shoe by the crease guide is now maintained until the end (at 420c) of the succeeding falling slope of the cam 420 reaches the roll 426.

During this period, in which the work is under the control of the crease guide, the corner 448a of the cam 448 passes the roll 446 and the falling slope 448b on the cam permits the forepart gage to move abruptly away from and out of the path of the shoe. As the operating point of the cutter approaches the inside heel breast line, the succeeding rising slope on the cam 448, which terminates at 448c, advances the forepart gage into its operative position at about the time when point 448c is presented to the roll 446. From this time on a "high" portion of the cam 448 is presented to the roll 446, while the cutter operates upon the uniformly curved heel end of the sole, under the control of the forepart gage. During this period a "low" portion of the cam 420, between the points 420c and 420d, is presented to the roll 426 whereby the crease guide is held in its inoperative position. When the points 448d and 420d on the cams reach the rolls 446, 426, respectively, the rounding cut will have been transferred around the heel end of the shoe to a point slightly to the rear of the outer heel breast line. Now a "high" portion of the cam 420, terminating at 420e, is presented to the roll 426 causing the crease guide to be advanced into its operative position. In the same period, a low portion of the cam 448, terminating at 448e, causes the forepart gage to be retracted from the work immediately after the point 448d passes the roll 446. The control of the shoe is thus shifted to the crease guide and such control is maintained until the arrival of the point 448e on the cam 448 at the roll 446, when the rounding cut will have been carried into the vicinity of the outer ball line. The crease guide is now retracted from the shoe upper because a "low" portion of the cam 420 extending from 420e to 420f is being presented to the roll 426. The radius of the cam 448 will ordinarily diminish from the point 448e to a minimum at about 448f which is presented to the roll 446 when the rounding cut passes the toe end of the shoe, and this change in the radius of the cam is made according to the desired "Baltimore" effect for which the cam is designed. Beyond the point 448f the radius of the cam again increases to provide a gradually increasing sole edge extension at the inner side of the forepart as the inner ball line is approached. However, as the terminal portion of a "rising" slope of the cam 448, which ends at 448a, is presented to the roll 446 a more abruptly rising slope on the cam 420 at 420g, and beyond, is presented to the roll 426 and causes the crease guide 36 to be advanced into engagement with the shoe and to carry the shoe slightly away from the forepart gage 49 just before the falling slope 448b on the cam 448 is presented to the roll 446. Thus, the control of the shoe by the crease guide is again resumed for the inside shank portion of the rounding cut.

All the cams 420, 448 are keyed upon a shaft 456 (Figs. 3 and 4) which is rotatably mounted in the frame 322 and has pinned thereto at its upper end a worm gear 458. This gear is driven by a worm 460 carried by a shaft 461 which is rotatably mounted in the frame 322 and is connected by a universal joint 462 to a splined shaft 464. The shaft 464 slides freely within a splined bore in a pinion 466 which is rotatably mounted upon the slide 330 in mesh with a gear 468 fast upon the rear end of a shaft 470 which also is rotatably mounted in the slide. The shaft 470 is connected by bevel gearing 472 to a telescoping shaft 474 upon the lower end of which a gear 476 (Fig. 8) is mounted. The gear 476 meshes with an idler gear 478 which is rotatably mounted upon the frame 72 in meshing relation with the above-mentioned gear 202. Through the above-described connections, the cams 420, 448 are rotated at a constant velocity through one revolution for each cycle of operation of the jack. The universal joint 462, the center of which is coaxial with the shaft 324, permits such vertical swinging of the cutter head as is necessary to permit it to rise and fall, according to variations in the level of the sole at the operating point of the cutter, without affecting the drive for the cams. Similarly, the splined joint between the shaft 464 and the pinion 466 permits shoe following movement of the cutter head laterally of the jack without affecting the drive for the cams.

Figure 13:
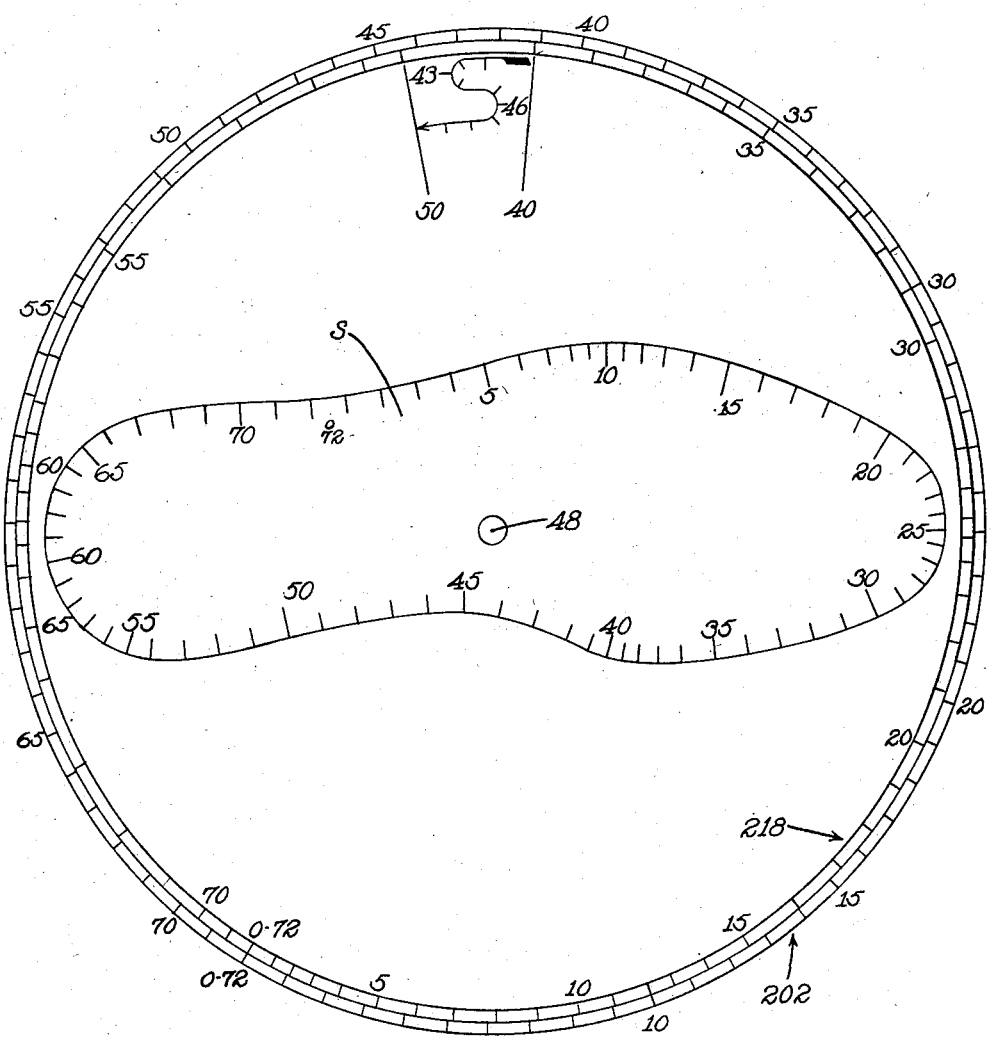
Fig. 13 is a diagrammatical view illustrating speed characteristics of the jack driving mechanism and of the feeding movement of the work.

The mode of operation of the jack driving mechanism and of the crease guide and forepart operating means will now be summarized with reference to Fig. 13. The outer circular scale is graduated in seventy-two equal parts representing equal displacements in equal periods of time of the abovementioned gear 202; and the inner circular scale similarly contains seventy-two divisions representing equal periods of time but variable displacements of the gear 218 relatively to the gear 202. From the relation between the graduations on the scales representing the same time intervals it is apparent, by inspection, how the gear 218 lags behind or leads the gear 202 at different times under the control of the above-described control mechanism comprising the cam 212.

Through the gear train connecting the gear 218 with the jack the latter receives a variable rotation upon the carrier related to that represented by the inner circular scale, such rotation of the jack being affected at all times to some extent by the epicyclic action in the gearing which is derived from oscillatory motion of the carrier. This rotary movement of the jack combined with the oscillatory movement of the carrier produces the variable feeding movement of the work indicated by the unequal spacing of graduations normal to the edge of the shoe bottom S, which graduations represent successive positions of the point of operation of the cutter upon the sole corresponding to the seventy-two stages of the rounding cycle indicated by the circular scales.

The direction of the feeding movement at all points about the sole edge is substantially in the direction of the tangent to the sole edge at the point of operation of the cutter. The direction of the graduations on the shoe bottom S represents that of the shoe following movement of the cutter head 10 toward and away from the jack and the change in the angular relation of these graduations represents the rotation to which the jack is subjected in order to maintain the sole edge and the feeding movement precisely normal to the shoe following movement of the cutter head at all times. Such rotation of the jack is provided, in the illustrated machine, about a succession of constantly moving instantaneous centers which are to the rear of the jack when a concave portion of the sole edge is being operated upon, in front of the jack when slightly convex portions of the sole edge is being operated upon, and are disposed within the area of the sole when the more sharply convex portions of the sole edge, as at the toe and heel ends thereof, are operated upon.

This rotation of the jack is the resultant of the variable oscillatory movement of the jack carrier 44 about the axis 46, and the variable rotation about the axis 48 of the jack upon the carrier. The oscillatory motion of the jack carrier tends to cause the shoe to be rotated about the axis 46 to the rear of the jack, and while the operating point of the cutter head traverses the outer shank of the shoe, where the sole is slightly concave (between 0 and 5), the oscillatory movement of the jack carrier is suitable and largely utilized to provide the desired movement of the work. However, at this time the jack is subject to a minimum of counterclockwise rotation upon the carrier which is so apportioned with the oscillating movement of the latter as to preserve the above-described normal relation, while the outer shank is being operated upon, between the shoe following movement of the cutter head and the direction of the sole edge and the feeding movement.

When the operating point of the cutter head traverses the inner shank of the sole where its contour is more sharply concave (between 43 and 46) than is the case at the outside shank, the left-to-right oscillation of the jack carrier combined with any counterclockwise rotation of the jack on the carrier, however small, will not bring the center of rotation of the shoe close enough to the center of curvature of this part of the sole edge, as indicated by the intersection of the graduations 44 and 45, to cause the above-described normal relation of the work and its feeding movement to the cutter head to be maintained.

As the rounding cut approaches the point 43 the gear 218 is abruptly decelerated and then, between points 43 and 46, is given a reversed clockwise rotation (see inner circular scale between 40 and 50, Fig. 13). A similar clockwise reversed rotation is imparted to the jack during this period, and this motion of the jack insures the desired normal relation of the sole edge and the feeding movement. When the rounding cut passes the point 46 the normal counterclockwise rotation of the jack is resumed for the remainder of the operating cycle.

It also is evident from the more closely spaced graduations on the shoe bottom that the feeding movement is subject to appreciable decelerations in the vicinity of the outer ball line (at 10), the toe end of the sole (at 25), the inner ball line (at 40), and the heel end of the sole (at 60). Conversely, the relatively wide spacing of the graduations on the shoe bottom between the localities mentioned above, indicates the ranges of relatively rapid feeding movement which is fast enough to compensate for the periods of deceleration.

Figure 6:
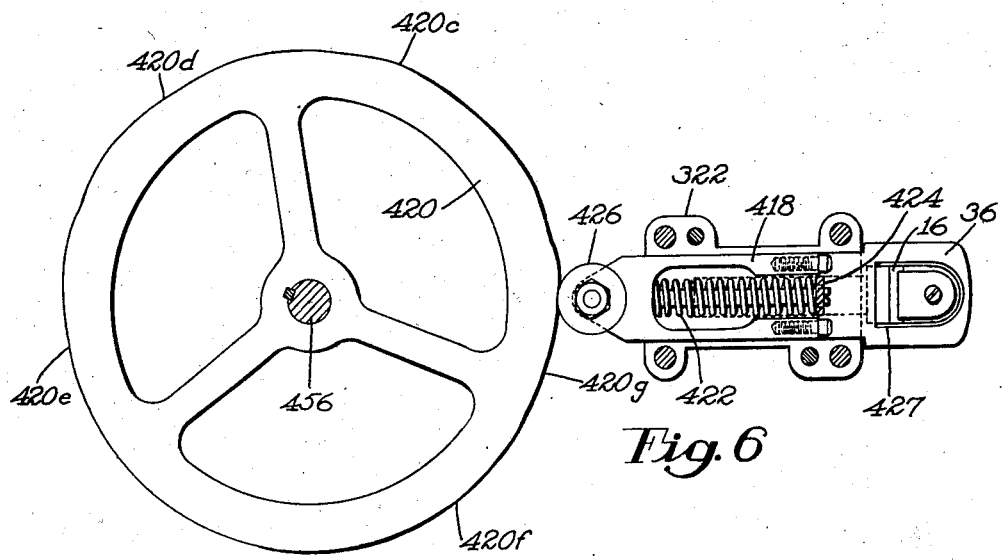
Fig. 6 is a sectional plan view of the anvil, the crease guide and control mechanism for the latter.

During the deceleration in the feeding movement of the work when the operating point passes the inner ball line (at 40), the cams 448 and 420 are in the positions in which they are illustrated in Figs. 6 and 7. At this time, the control of the shoe will just have been taken over by the crease guide from the forepart gage, and the latter will be retracted from the shoe as soon as the point 448a on the cam 448 moves away from the roll 446, thereby to avoid any interference between the forepart gage 49 and the overhanging shank portion of the work.

An opposite interchange of the crease guide and the forepart gage takes place during the period of deceleration which occurs when the operating point passes the vicinity of the outer ball line (at 10). That is, during this period portions of the cams 448, 420 in the vicinity of the points 448e and 420e, respectively, will be presented to the rolls 446 and 426. Thus, provision has been made for obtaining, as smoothly as possible, transitions between the periods of operation of the crease guide and forepart gage in the ball line area of the shoe, where an irregularity in the sole edge would be conspicuous and seriously detract from the appearance and style of the shoe.

Having thus described my invention, what I claim as new and desire to secure by Letters Patent of the United States is:

1. In a rough rounding machine, a cutter head, a jack for a lasted shoe, driving means for imparting a cycle of relative movement of variable velocity to said cutter head and jack to cause the operating point of said cutter head upon the shoe to be transferred thereabout with a period of deceleration when said operating point passes a predetermined portion of the sole edge, a forepart gage, a crease guide, said gage and guide being movable between operative and inoperative positions, and mechanism for moving said gage and guide oppositely to each other during the said period of deceleration to effect an interchange in the positions of said gage and guide.

2. In a rough rounding machine, a cutter head, a jack for a lasted shoe, said cutter head carrying a gage and guide for positioning said cutter head with respect to the shoe, said gage and guide being movable between operative and inoperative positions, driving means for moving said jack progressively to present the periphery of the shoe at a variable velocity to said cutter head with spaced periods of deceleration, and mechanism driven by said driving means for operating said gage and guide to effect an interchange in their positions during each of said periods of deceleration.

3. In a rough rounding machine, a cutter head having a rounding knife, a jack for a lasted shoe, driving means for imparting a cycle of relative movement to said cutter head and jack progressively to present the periphery of the shoe to said cutter head at a variable velocity with a period of deceleration when the operating point of said knife upon the shoe passes a junction of its shank and forepart, a forepart gage, a crease guide, said gage and guide each being movable alternately with the other into and out of an operative position, and mechanism operated in timed relation to the operation of said driving means for operating said gage and guide to effect an interchange in their positions in predetermined relation to said period of deceleration.

4. In a rough rounding machine, a cutter head, a jack for a lasted shoe, driving means for moving said jack progressively to present the periphery of the shoe to the cutter head at a variable velocity with periods of deceleration when the operating point of said cutter head upon the shoe passes the junction of its shank and forepart at each side thereof, a forepart gage, a crease guide, said gage and guide each being mounted upon said cutter head for movement into and out of an operative position, and means operated in synchronism with said jack for operating said gage and guide to effect an interchange of their positions at each side of the shoe during each period of deceleration.

5. In a rough rounding machine, a cutter head having a rounding knife, a jack for a lasted shoe, driving means for imparting a cycle of relative movement of variable velocity to said cutter head and jack progressively to present the periphery of the shoe to the cutter head with periods of deceleration when the operating point of said cutter head upon the shoe passes the junction of its shank and forepart at each side thereof, a forepart gage, a crease guide, said gage and guide being movable alternately with each other from an inoperative position into an operative position, and mechanism operated by said driving means for effecting an interchange of said guide and gage during each of said periods of deceleration.

6. In a rough rounding machine, a cutter head having a rounding knife, a jack for a lasted shoe, driving means for imparting a cycle of relative movement of variable velocity to said cutter head and jack progressively to present the periphery of the shoe to the cutter head with periods of deceleration when the operating point of said knife upon the shoe passes the junction of its shank and forepart at each side thereof, a forepart gage, a crease guide, operating means for said gage and guide, and connections between said driving means and said operating means for effecting an interchange of said gage and guide at a point at each side of the shoe in predetermined relation to the portion of the sole edge traversed by said knife during each period of deceleration.

7. In a rough rounding machine, a cutter head, a jack for a lasted shoe, driving means for moving said jack progressively to present the periphery of the shoe to said cutter head at a variable velocity with a period of deceleration when the operating point of said cutter head upon the shoe passes a junction of its shank and forepart, a gage for positioning said cutter head with respect to the shoe when its fore and heel parts are operated upon, a guide for positioning the shoe when its shank portion is operated upon, said gage and guide each being mounted for movement between operative and inoperative positions, and mechanism operated by said driving means for interchanging the positions of said gage and guide once when the operating point of said cutter head on the shoe passes a junction of its shank and heel part and again during said period of deceleration.

8. In a rough rounding machine, a cutter head, a jack for a lasted shoe, driving means for moving said jack progressively to present the periphery of the shoe to said cutter head at a variable velocity with periods of deceleration when the operating point of said cutter head upon the shoe passes the junctions of its shank and forepart, a gage for positioning said cutter head with respect to the shoe when its fore and heel parts are operated upon, a guide for positioning the shoe when its shank portions are operated upon, said gage and guide each being mounted for movement between operative and inoperative positions, and mechanism operated by said driving means for interchanging the positions of said gage and guide when the operating point of said cutter head upon the shoe passes the junction of the shank and heel part at each side of the sole and also during each of said periods of deceleration.

9. In a rough rounding machine, a cutter head for rounding the sole edge of a shoe presented thereto, a jack for holding a shoe upon a last, an oscillating carrier upon which said jack is rotatably mounted, mechanism for oscillating said carrier, a second mechanism for rotating said jack upon said carrier, said mechanisms cooperating to cause the periphery of the shoe to be progressively presented to said cutter head at a variable velocity with periods of deceleration when the operating point of said cutter head upon the shoe traverses the junctions of the shank and forepart, a forepart gage, a crease guide, said gage and guide being movable between operative and inoperative positions, and means for moving said gage and guide oppositely to each other during the said periods of deceleration to effect an interchange in the positions of said gage and guide.

10. In a rough rounding machine, a cutter head for rounding the sole edge of a shoe presented thereto, a jack for holding a shoe upon a last, an oscillating carrier upon which said jack is rotatably mounted, mechanism for rotating said jack in opposite directions upon said carrier, a second mechanism for imparting to said carrier a cycle of operation comprising four oscillations during which the operating point of said cutter head upon the shoe is transferred around its periphery, a forepart gage, a crease guide, said gage and guide being movable between operative and inoperative positions, and means operating in synchronism with said mechanisms for moving said gage and guide oppositely to each other between their said positions during the first and third oscillations of said carrier in each of its cycles of operation.

11. In a rough rounding machine, a cutter head, a jack for a lasted shoe, and driving means for imparting a cycle of movement to said jack progressively to present the periphery of the sole of the shoe to said cutter head, said jack being mounted to rotate and to oscillate about different axes, said driving means comprising mechanism for oscillating said jack, and a second mechanism for simultaneously rotating said jack, said mechanisms cooperating to impart to the shoe a feeding movement of variable velocity having periods of deceleration when the point of operation of said cutter head upon the sole passes its toe end and a junction of its shank and forepart.

12. In a rough rounding machine, a cutter head, a jack for a lasted shoe, and driving means for imparting a cycle of relative movement to said cutter head and jack to cause the operating point of said cutter head upon the sole of the shoe to be transferred progressively thereabout at a variable velocity with periods of deceleration when said operating point passes each end portion of the sole and the vicinity of the ball line at each side thereof.

13. In a rough rounding machine, a cutter head, a jack for a lasted shoe, and means for operating said jack progressively to present the periphery of the sole of the shoe to said cutter head, said jack being mounted to rotate and to oscillate about different axes, said jack operating means comprising mechanism for imparting a cycle of oscillations to said jack, and a second mechanism for rotating said jack in a direction opposite to that of the oscillation of said jack during which the outer side of the sole is presented to said cutter head and for reversely rotating said jack during a portion of that oscillation of the jack during which the inner side of the shoe is presented to said cutter head.

14. In a rough rounding machine, a cutter head, a jack for a lasted shoe, and means for operating said jack progressively to present the periphery of the sole of the shoe to said cutter head, said jack being mounted to rotate and to oscillate about different axes, said jack operating means comprising mechanism for imparting a cycle of oscillations to said jack, and a second mechanism for rotating said jack in the direction of its oscillating movement during a limited period when the junction of the shank and forepart of the sole at its inner side is presented to said cutter head and for rotating said jack in the opposite direction during the remainder of said cycle.

15. In a rough rounding machine, a cutter head, a jack for a lasted shoe, and driving means for imparting a cycle of movement to said jack progressively to present the periphery of the sole of the shoe to said cutter head, said jack being mounted to rotate and to oscillate about different axes, said driving means comprising mechanism for oscillating said jack, and a second mechanism for rotating said jack in one direction with respect to said cutter head while its point of operation upon the sole traverses a portion of the inner side of the sole and for rotating said jack in the opposite direction as said operating point traverses the inner side of the sole at each side of said portion.

16. In a rough rounding machine, a cutter head, a jack for a lasted shoe, and driving means for imparting a cycle of movement to said jack progressively to present the periphery of the sole of the shoe to said cutter head, said jack being mounted to rotate and oscillate about different axes, said driving means comprising mechanism for oscillating said jack, and a second mechanism for rotating said jack with respect to said cutter head in one direction while the operating point of said cutter head upon the sole departs from the junction of the shank and forepart of the sole at its inner side and in the opposite direction while the said operating point traverses the said junction.

17. In a rough rounding machine, a cutter head, a jack for a lasted shoe, and driving means for imparting a cycle of movement to said jack progressively to present the periphery of the sole of the shoe to said cutter head, said jack being mounted to rotate and to oscillate about different axes, said driving means comprising mechanism for oscillating said jack to cause side and end portions of the sole to be presented alternately to said cutter head during successive oscillations of said jack, and a second mechanism for rotating said jack oppositely to the direction of its oscillation during the approach and departure of the point of operation of said cutter head toward and from, respectively, the junction of the shank and forepart of the sole at the inner side thereof and for rotating said jack in the direction of its oscillation when the said junction passes said cutter head.

18. In a rough rounding machine, a cutter head, a jack for a lasted shoe, and means for simultaneously oscillating and rotating said jack about different axes progressively to present the periphery of the sole of the shoe to said cutter head, said jack operating means comprising mechanism for imparting rotation of variable velocity to said jack during successive oscillations thereof in one direction and for reversing the rotation of said jack during limited periods in every other oscillation of said jack in the other direction.

19. In a rough rounding machine, a cutter head, a jack for a lasted shoe, and means for simultaneously oscillating and rotating said jack about different axes progressively to present the periphery of the sole of the shoe to said cutter head, said jack operating means comprising mechanism for rotating said jack opposite to the direction of its oscillation with a variable velocity during successive oscillations of said jack in one direction and for imparting a reverse rotation to said jack in the direction of its oscillating movement during every other oscillation in the other direction.

20. In a rough rounding machine, a cutter head for rounding the sole edge of a shoe presented thereto, a jack for holding a last carrying a shoe to be operated upon, an oscillating carrier upon which said jack is rotatably mounted, mechanism for oscillating said carrier alternately in opposite directions, and mechanism for rotating said jack on said carrier in one direction during every other oscillation of said carrier in one direction and for rotating said jack on said carrier opposite to its first-mentioned direction of rotation during the remaining oscillations of said carrier.

21. In a rough rounding machine, a cutter head for rounding the sole edge of a shoe presented thereto, a jack for holding a last carrying a shoe to be operated upon, an oscillating carrier upon which said jack is rotatably mounted, mechanism for imparting to said carrier a cycle of operation comprising four oscillations during which the operating point of said cutter head upon the shoe is transferred around its periphery, and mechanism for rotating said jack upon said carrier in one direction during the third oscillation of said carrier in each cycle of operation thereof and for rotating said jack variably in the opposite direction during the remainder of each cycle of operation of said carrier.

22. In a rough rounding machine having a cutter head, a jack for a lasted shoe, mechanism for relatively moving said cutter head and jack progressively to transfer the point of operation of said cutter head upon the shoe about the periphery of the sole thereof, said mechanism comprising a driving member operated at a constant velocity, a driven member, and connections between said members operated in response to movement of said driving member for imparting movement to said driven member in a direction opposite to that of said driving member as the operating point of said cutter head upon the sole passes the junction of the shank and forepart of the sole at its inner side and for operating said driven member in the direction of movement of said driving member at a variable velocity as the operating point of said cutter head upon the sole is transferred about the remainder of its periphery.

23. In a rough rounding machine, a cutter head, a jack for a lasted shoe, and mechanism for relatively moving said cutter head and jack progressively to present the periphery of the sole of the shoe to said cutter, said mechanism comprising a driving member operated at a constant velocity, a driven member, and connections operated by said driving member for imparting a variable motion to said driven member including a period of deceleration of said driven member relatively to said driving member while the operating point of said cutter head upon the sole passes the junction of the shank and forepart of the sole at its inner side.

24. In a rounding machine having a cutter head, a jack for a lasted shoe, mechanism for moving said jack progressively to present the periphery of the shoe thereon to said cutter head, said mechanism comprising a driving member operated at a constant velocity, a driven member, and connections operated by said driving member for imparting a variable velocity to said driven member in the direction of movement of said driving member during the transfer of the operating point of said cutter head around the shoe and for reversing the movement of said driven member with respect to said driving member while the operating point of said cutter head upon the shoe passes the junction of the shank and forepart of the sole at its inner side.

25. In a rough rounding machine having a cutter head for operating upon the sole of a shoe, a jack carrier upon which a jack for a lasted shoe is rotatably mounted, means for moving said carrier to and fro laterally of said cutter head, and means for rotating said jack comprising a driving member operated at a constant velocity, a driven member, and connections operated by said driving member for imparting a variable velocity to said driven member with decelerations when the operating point of said cutter head upon the sole passes the extremities of the sole and the junction of the shank and forepart of the sole at its outer side.

26. In a rough rounding machine, a cutter head, a jack for a lasted shoe, and mechanism for relatively moving said cutter head and jack to cause the operating point of said cutter head upon the sole of the shoe to be progressively transferred thereabout, said mechanism comprising driving and driven gears, said driving gear being driven at a constant velocity in the same direction, a fixed cam, and connections operated by said driving gear and cooperating with said cam to rotate said driven gear alternately in the direction of rotation of said driving gear and in the opposite direction.

27. In a rough rounding machine, a cutter head, a jack for a lasted shoe, and mechanism for relatively moving said cutter head and jack to cause the operating point of said cutter head upon the sole of the shoe to be transferred progressively thereabout, said mechanism comprising driving and driven gears, said driving gear being driven at a constant velocity in the same direction, a fixed cam, and connections operated by said driving gear and cooperating with said cam to rotate said driven gear at a variable velocity.

28. In a rough rounding machine having a cutter head, a jack carrier upon which a jack for a lasted shoe is rotatably mounted, means for moving said carrier to and fro laterally of said cutter head, and means for rotating said jack comprising coaxially mounted driving and driven gears, and connections between said gears for imparting rotation of variable velocity to said driven gear, said connections comprising a fixed cam, an arm associated with said driving gear, a lever fulcrumed upon said arm and engaging said cam, and a link connecting said lever with said driven gear.

29. In a rough rounding machine, a cutter head, a jack for a lasted shoe, and mechanism for imparting a cycle of relative movement to said cutter head and jack to cause the operating point of said cutter head upon the sole to be progressively transferred about its periphery, said mechanism comprising a driving gear operable at a constant velocity in the same direction, a driven gear, a fixed cam, and connections between said gears cooperating with said cam for rotating said driven gear at a variable velocity in the direction of rotation of said driving gear during initial and final periods in each cycle and for rotating said driven gear in the opposite direction during an intermediate period in each cycle.

30. In a rough rounding machine having a cutter head for operating upon the sole of a shoe, a jack carrier upon which a jack for a lasted shoe is rotatably mounted, means for moving said carrier to and fro laterally of said cutter head, and means for rotating said jack comprising a driving gear which is rotated at a constant velocity, a driven gear, and connections between said gears for rotating said driven gear at a variable velocity in one direction during the passage of the operating point of said cutter head about the periphery of the sole and for reversing the direction of rotation of said driven gear as the operating point of said cutter head upon the sole passes the junction of the shank and forepart of the sole at its inner side.

31. In a rough rounding machine, a cutter head, a jack carrier mounted to oscillate with respect to said head about one axis, a jack mounted to rotate about another axis upon said carrier, mechanism for imparting to said carrier a cycle of operation comprising four oscillations during which the operating point of said cutter head upon the shoe is transferred about its periphery first along its outer side, then around the toe end, then along its inner side, and finally around the heel end, respectively, and mechanism for variably rotating said jack upon said carrier in the direction of rotation of said carrier during its first, second and fourth oscillations, and for reversing the rotation of said jack during its third oscillation.

32. In a rough rounding machine, a cutter head, a jack carrier mounted to oscillate with respect to said head about one axis, a jack mounted to rotate about another axis upon said carrier, and means for operating said jack and carrier progressively to present the periphery of the sole of a shoe on said jack to said cutter head, said means comprising mechanism for imparting to said carrier a cycle of operation comprising four oscillations during which the operating point of said cutter head upon the sole is moved first along its outer side, then around the toe end, then along its inner side, and finally around the heel end respectively, and mechanism for variably rotating said jack upon said carrier in the direction of rotation of said carrier during its second oscillation, said mechanisms cooperating to decelerate the work feeding movement of said jack during the first and third oscillations while the operating point of said cutter head passes the junctions of the shank and forepart of the sole at its inner and outer sides, respectively.

33. In a rough rounding machine, a cutter head, a jack carrier mounted to rotate with respect to said head about one axis, a jack mounted to rotate about another axis upon said carrier, mechanism for imparting to said carrier a cycle of operation comprising four oscillations during which the operating point of said cutter head upon a shoe on the jack is transferred about its periphery first along its outer side, then around the toe end, then along its inner side, and finally around the heel end, respectively, and mechanism for rotating said jack upon said carrier variably in the direction of rotation of said carrier during its first, second and fourth oscillations, the rotation of said jack being reversed during the third oscillation of said carrier.

References Cited in the file of this patent
UNITED STATES PATENTS
2,293,080    Ray _____ Aug. 18, 1942